United States Patent
Kamotani

(10) Patent No.: US 8,532,470 B2
(45) Date of Patent: Sep. 10, 2013

(54) PICTURE EDITING DEVICE, PICTURE EDITING METHOD, INTEGRATED CIRCUIT, AND RECORDING MEDIUM

(75) Inventor: Yusuke Kamotani, Osaka (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 13/249,855

(22) Filed: Sep. 30, 2011

(65) Prior Publication Data

US 2012/0082436 A1 Apr. 5, 2012

(30) Foreign Application Priority Data

Oct. 5, 2010 (JP) ................. 2010-225332

(51) Int. Cl.
*H04N 5/93* (2006.01)

(52) U.S. Cl.
USPC .......................................... 386/278; 386/280

(58) Field of Classification Search
None
See application file for complete search history.

(56) References Cited

U.S. PATENT DOCUMENTS 7,546,532 B1 * 6/2009 Nichols et al. ............... 715/716
2006/0114327 A1 * 6/2006 Araya et al. ............. 348/207.99

FOREIGN PATENT DOCUMENTS

| JP | 2006-25207 | 1/2006 |
| JP | 2006-157197 | 6/2006 |
| JP | 2009-38826 | 2/2009 |
| JP | 2009-290336 | 12/2009 |

* cited by examiner

*Primary Examiner* — Huy T Nguyen
*Assistant Examiner* — Asher Khan
(74) *Attorney, Agent, or Firm* — Wenderoth, Lind & Ponack, LLP

(57) ABSTRACT

An electronic device (100) capable of editing, with greater focus on story configuration, a group of pictures to be successively displayed includes: a time information obtainment unit (111) which obtains time information (111*a*) of a video in which one or more of the pictures are successively displayed; a template reading unit (113) which reads template data (104*d*) for specifying (i) the number of repetitions of each of units of repetition made up of one or more switching effects used in switching between two of the pictures included in the video, and (ii) a unit time of each of the one or more switching effects of the unit of repetition; an adjustment unit (114) which adjusts the number of repetitions of the unit of repetition, based on the obtained reproduction time information (111*a*) and each of the unit times specified in the read template data (104*d*).

10 Claims, 7 Drawing Sheets

PICTURE EDITING DEVICE, PICTURE EDITING METHOD, INTEGRATED CIRCUIT, AND RECORDING MEDIUM

BACKGROUND OF THE INVENTION (1) Field of the Invention

The present invention relates to electronic devices and particularly to an electronic device capable of editing pictures.

(2) Description of the Related Art

Electronic devices and programs capable of easily editing obtained materials such as still picture data items or video data items are well known.

For example, Japanese Unexamined Patent Application Publication No. 2006-157197 (Patent Reference 1) discloses a photo movie creator intended for adjusting total reproduction time period of a photo movie according to a designation, without changing the total number of still pictures which are used as materials.

In the photo movie creator in Patent Reference 1, when the total reproduction time period of a movie is to be changed to a total reproduction time period designated by a user, addition and deletion of scenes is carried out by moving a specified still picture, from a scene for which an effect using plural still pictures is designated, to another scene.

SUMMARY OF THE INVENTION

When configuring a group of pictures for successive displaying, the order of display effects depends on the story configuration of the pictures to be successively displayed.

However, in the photo movie creator in Patent Reference 1, one scene which is assigned for a certain display effect is added or deleted, and thus there are cases where the planned story configuration breaks up.

The present invention is conceived in view of the aforementioned problem and has as an object to provide an electronic device (picture editing device) capable of editing, with more emphasis on story configuration, a group of pictures to be successively displayed.

In order to achieve the aforementioned object, the picture editing device according to an aspect of the present invention is a picture editing device including: a picture obtainment unit configured to obtain a plurality of pictures; a reproduction time period obtainment unit configured to obtain a reproduction time period for when a video is reproduced, the video including one or more of the pictures which are displayed successively; an information reading unit configured to read template information for specifying (i) the number of repetitions of each of units of repetition made up of one or more switching effects used in switching between two of the pictures included in the video, and (ii) a unit time of each of the one or more switching effects of the unit of repetition; and an adjustment unit configured to adjust the number of repetitions of the unit of repetition, based on the obtained reproduction time period and each of the unit times specified in the read template information.

The present invention can provide an electronic device (picture editing device) capable of editing a video in which pictures are successively displayed, with more emphasis on the story configuration thereof.

FURTHER INFORMATION ABOUT TECHNICAL BACKGROUND TO THIS APPLICATION

The disclosure of Japanese Patent Application No. 2010-225332 filed on Oct. 5, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Hereinafter, embodiments of the present invention shall be described with reference to the Drawings.

Figure 4:
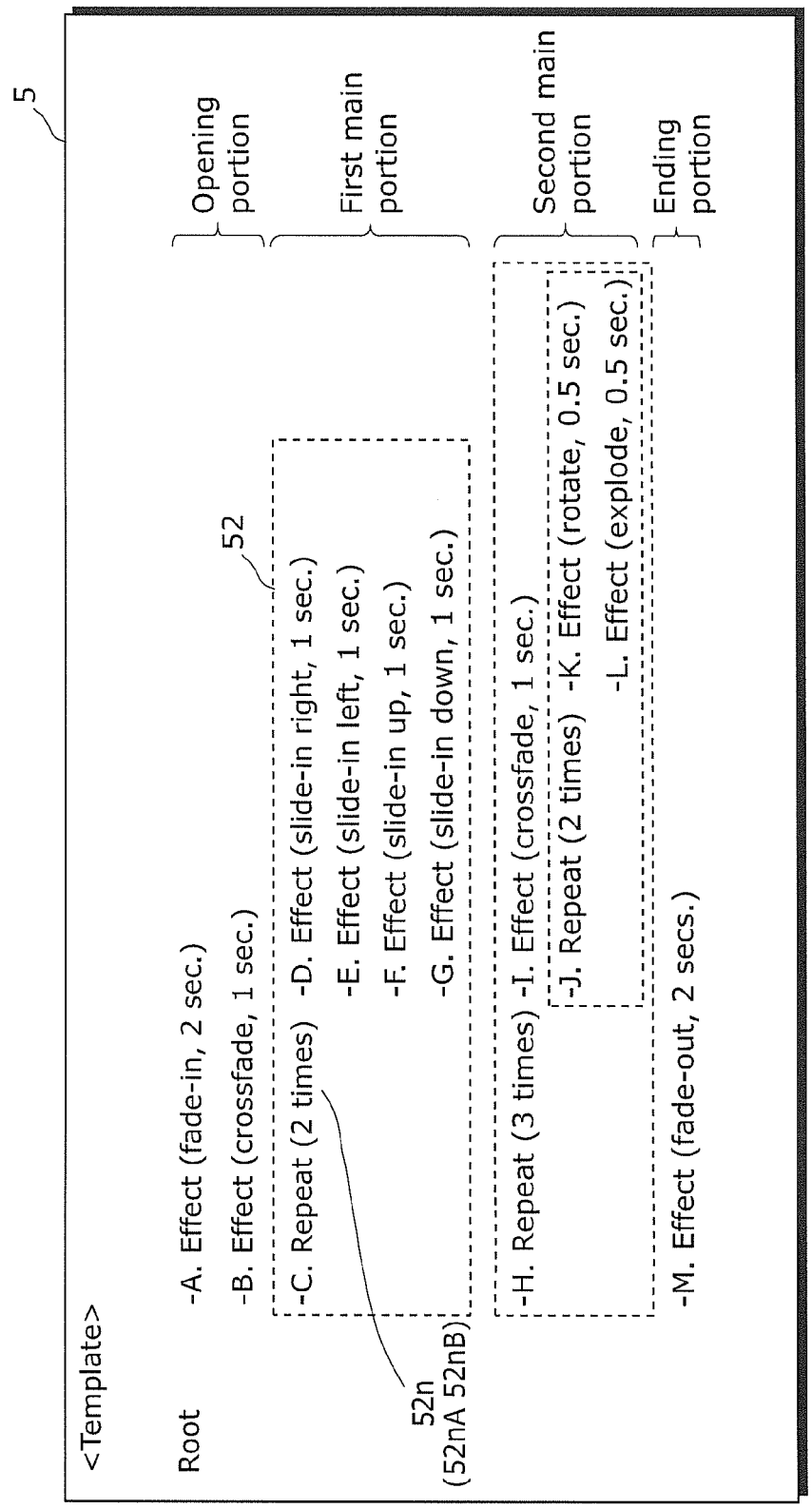
FIG. 4 is a diagram for describing a hierarchical structure in a template according to Embodiment 1.
Figure 7:
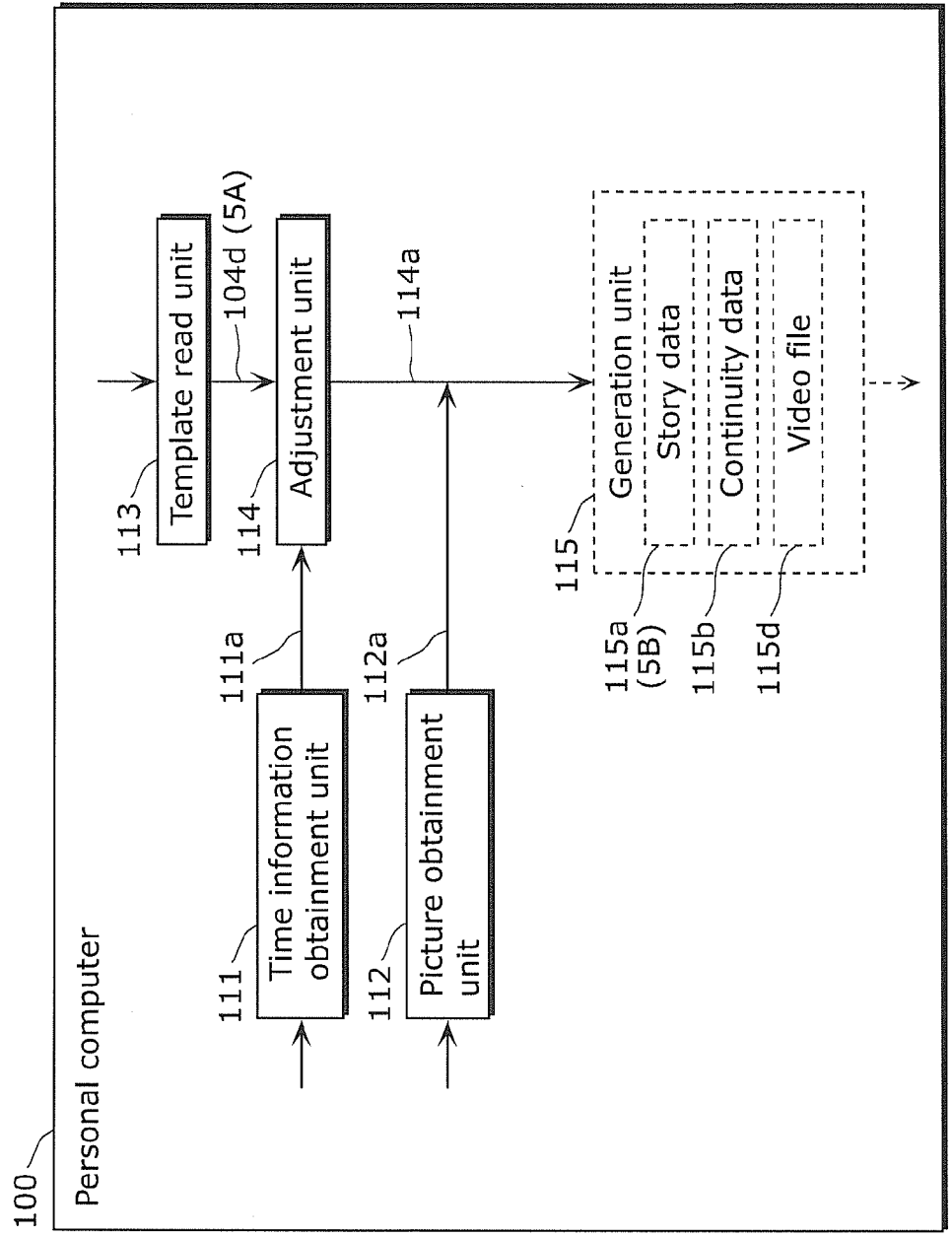
FIG. 7 is a diagram showing a configuration of functions realized through a personal computer.

The picture editing device (electronic device, information processing device, PC 100) according to the embodiments includes: a picture obtainment unit 112 (FIG. 7) which obtains a plurality of display pictures 112a (FIG. 7, and so on); a time obtainment unit (111) which obtains a reproduction time period (see time information 111a in FIG. 7, the total reproduction time period described earlier, and so on) for when a video (video file 115d (FIG. 7) and so on) in which one or more of the display pictures 112a are displayed successively is reproduced; a template reading unit 113 which reads template data 104d (FIG. 1, FIG. 7, and so on) for specifying (i) the number of repetitions (for example, 2 times in repetition count data 52n in FIG. 4) of each of units of repetition (C) made up of one or more switching effects (for example, the effect "slide-in left" of E) used in switching between two of the pictures (for example, display picture 112a in D and display picture 112a in E, in FIG. 4) included in the video, and (ii) a unit time (1 sec., 1 sec., 1 sec., 1 sec.) of each of the one or more switching effects (D to G) of the unit of repetition (C); and an adjustment unit 114 which adjusts the number of repetitions (see, repetition count 52n (FIG. 4)) of the unit of repetition (C), based on the obtained reproduction time period and each of the unit times (total time (4 secs.) obtained by summing up the unit times: 1 sec., 1 sec., 1 sec., 1 sec.) specified in the read template data 104d.

It should be noted that the picture editing device according to the embodiments includes a generation unit 115 which generates the video for successive display, based on the adjusted number of repetitions (see repetition count data 52nB (FIG. 4)) and one or more of the display pictures 112a in the unit of repetition.

It should be noted that the template data 104 specifies, using a hierarchical structure, a relatively high-level one of the units of repetition (for example, H in FIG. 4) and a relatively low-level one of the units of repetition (J), together with the number of repetitions (for example, 3 times shown in FIG. 4) and unit times (1 sec., 0.5 secs., 0.5 secs.) of the one or more switching effects (nodes I, K, L) of the specified units of repetition (for example, H).

It should be noted that the adjustment unit 114 preferentially adjusts the number of repetitions of a unit of repetition (for example, C "1+1+1+1=4 secs." which is longer than the "1+(0.5+0.5)×2=3" of H) having a longer total time (4 secs.) among the units of repetition, the total time being obtained by summing up the respective unit times (1 sec., 1 sec., 1 sec., 1 sec, and so on) of the one or more switching effects ("effects of D to G") of the unit of repetition (for example, C).

Accordingly, when the number of repetitions is to be adjusted to an increased number of times, it is possible to prevent the number of repetitions of a unit of repetition (H) having a short total time from being increased. This (i) prevents displaying which the user easily becomes tired of due to the same pictures being displayed over a relatively short cycle because the number of repetitions of a unit of repetition (H) having a short total time is increased, and (ii) allows more appropriate displaying.

Embodiment 1

The personal computer (PC) 100 according to Embodiment 1 is capable of editing a group of pictures to be successively displayed, with more emphasis on story configuration. In the present invention, the case of creating a movie shall be described as an example of a group of pictures to be successively displayed.

In the creation of a movie, a user can adopt background music (BGM) prepared by default or BGM that is arbitrarily registered by the user.

In the movie creation according to Embodiment 1, a story is created by arranging input pictures successively according to a template selected by the user and the BGM set by the user.

Here, a template describes the display time periods (reproduction time periods) of the successively arranged pictures and switching effects between pictures.

Hereinafter, a configuration and operation of a system shall be described in detail with reference to the Drawings.

1. System Configuration

Figure 1:
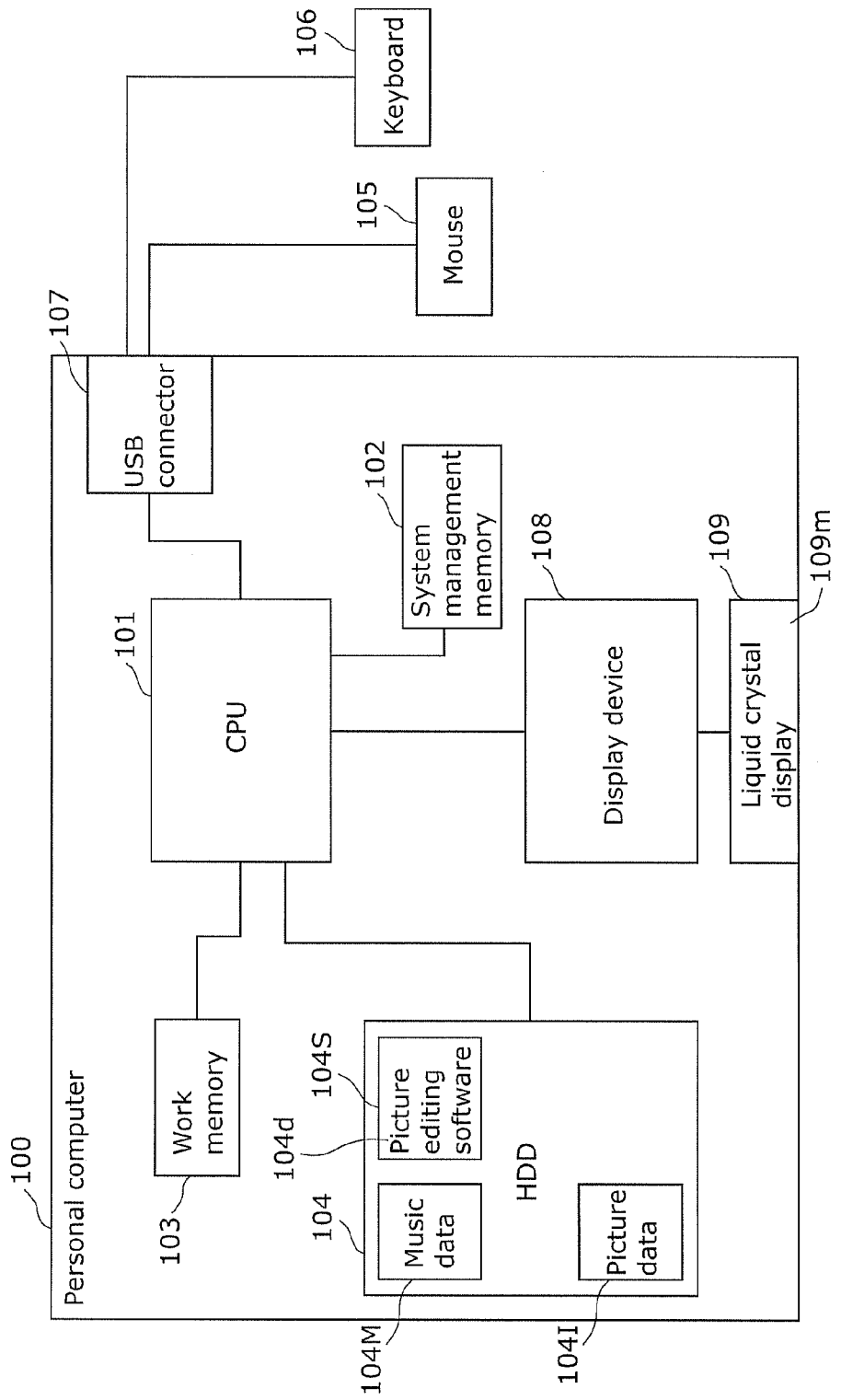
FIG. 1 is a configuration diagram of a PC according to Embodiment 1.

First, the system configuration of the personal computer (PC) 100 shall be described using FIG. 1.

FIG. 1 shows the overall configuration of the PC 100.

The PC 100 includes a central processing unit (CPU) 101, a system management memory 102, a work memory 103, a hard disk drive (HDD) 104, a mouse 105, a keyboard 106, a universal serial bus (USB) connector 107, a display device 108, a liquid crystal display 109, and so on.

The CPU 101 is a processing unit which executes processes on the PC 100.

The CPU 101 is electrically connected to each of the system management memory 102, the work memory 103, the HDD 104, the display device 108, and the USB connector 107.

The CPU 101 is capable of changing the picture to be displayed on the liquid crystal display 109, via the display device 108.

Furthermore, the CPU 101 receives, via the USB connector 107, the user's operation information inputted using the mouse 105 and the keyboard 106. Specifically, operation information inputted through the mouse, and so on, is obtained through the CPU 101.

Furthermore, although not shown in the figure, the CPU 101 controls, as a whole, the system for supplying power, and so on, to the respective elements of the PC 100. For example, the CPU 101 may be at least a part of a control unit that performs such control.

The system management memory 102 is a memory which holds an operating system (OS), and so on.

Furthermore, the system time, and so on, are stored in the system management memory 102.

The system time is updated by way of the CPU 101 operating a program of the OS.

The work memory 103 is a memory which temporarily stores information necessary in order for the CPU 101 to execute various processing operations.

When arranging pictures successively to create a story consisting of a series of successively displayed group of pictures, the CPU 101 performs such creation according to the template selected by the user.

The information of the template selected by the CPU 101, information of a story currently being created, and so on, are stored in the work memory 103. It should be noted that details of the template information shall be described later.

The mouse 105 is a pointing device used during the editing operation by the user. By operating the mouse 105, the user can select a picture data item, a music data item, and the template (see a material selection area 200, a BGM selection area 202, and a template selection area 201 in FIG. 2 to be described later) on a screen of the picture editing software (see picture editing software (program) 104S shown in FIG. 1).

The keyboard 106 is a keyboard device by which the user enters characters, and so on, at the time of the editing operation.

The USB connector 107 is a connector for connecting the mouse 105 and the keyboard 106 to the PC 100.

The display device 108 is a device for converting, into an image, the picture information on which the CPU 101 has performed arithmetic processing. The display device 108 forwards the picture information to the liquid crystal display 109.

The liquid crystal display 109 is a display device which displays the picture information that has been converted into an image by the display device 108.

The CPU 101 reads the picture editing software (program) 104S from the hard disk drive (HDD) 104, stores the picture editing software in the work memory 103, and activates and executes the picture editing software. Furthermore, the CPU 101 executes the following processes according to the program of the picture editing software:

(1) Receive, via the USB connector 107, the selection operations and editing operations of the user performed using the mouse 105 and the keyboard 106;

(2) Read the reproduction time period of a music data item selected or registered by the user for the story to be created;

(3) Read the details described in the template selected by the user;

(4) Arrange input pictures according to the story, based on a result of comparison between the reproduction time period of the story defined by the template and the reproduction time period of the music data item to be used; and (5) Supply picture information of created story to the display device 108 for displaying on the liquid crystal display 109.

2. Configuration of Selection Screen

Figure 2:
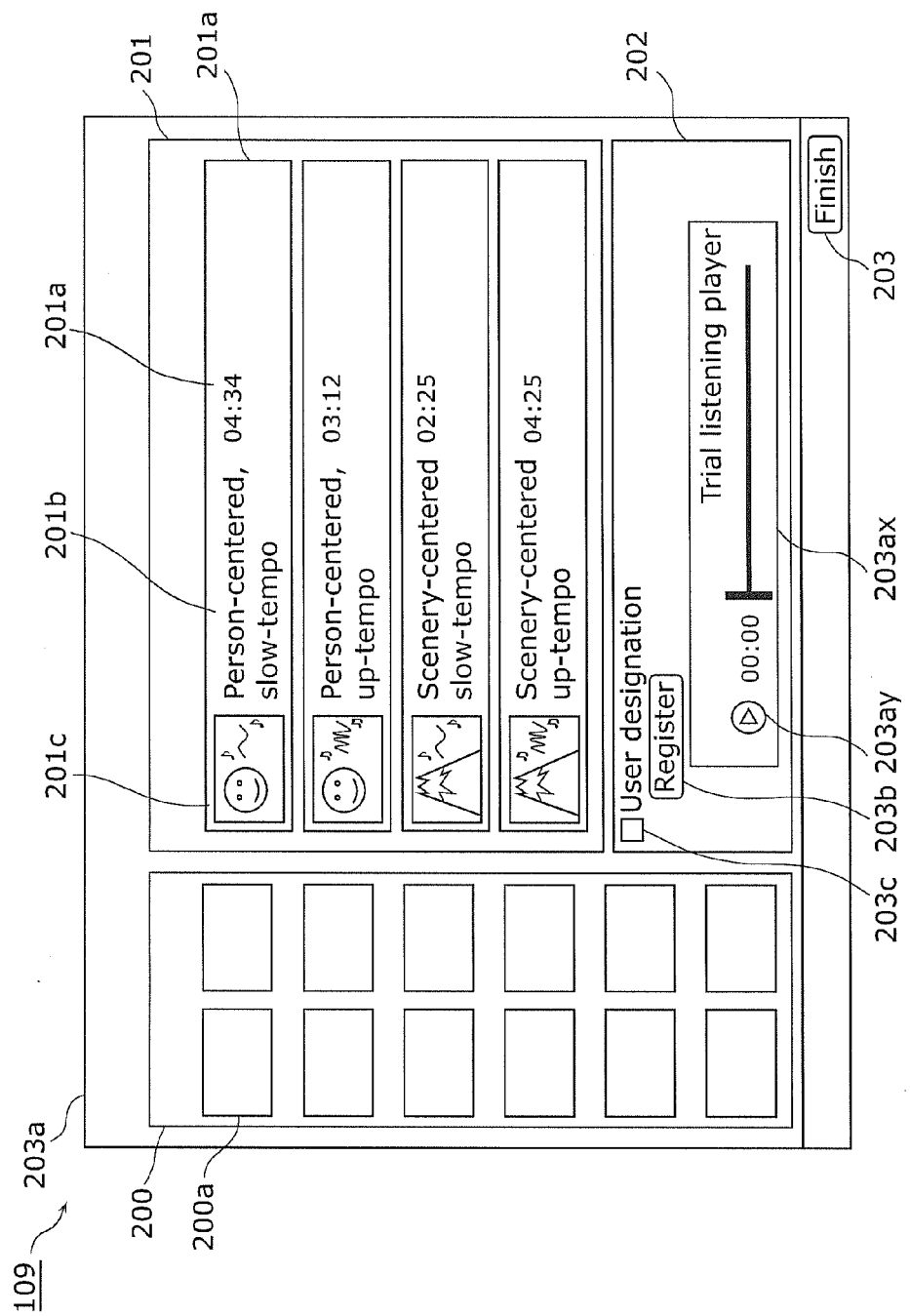
FIG. 2 is a diagram showing an image of a selection screen of a liquid crystal display according to Embodiment 1.

Next, a configuration of a selection screen displayed on the liquid crystal display 109 shall be described using FIG. 2.

FIG. 2 is a diagram showing an image of the selection screen of the liquid crystal display 109.

As shown in FIG. 2, the selection screen (screen 203*a*) displayed on the liquid crystal display 109 includes the material selection area 200, the template selection area 201, the BGM selection area 202, a finish button 203, and so on.

The material selection area 200 is an area in which the picture data items, which are the materials for creating the story, are displayed.

Here, the picture data items which are the materials include still picture data items and video data items.

As shown in FIG. 2, plural picture data items are displayed on the material selection area 200.

It should be noted that, for example, as shown in the figure, the material selection area 200 may include plural regions 200*a*, and each of the regions 200*a* may display a picture indicating the picture data item for that region 200*a*.

It should be noted that the one or more picture data items displayed on the material selection area 200 may be all of the picture data items stored in the HDD 104, or one or more picture data items obtained by selectively retrieving only picture data items stored in a specific folder. Alternatively, the one or more picture data items displayed on the material selection area 200 may be one or more picture data items obtained by retrieving picture data items sorted out by a user.

It should be noted that the priority of the picture data items displayed on the material selection area 200, as picture data items to be incorporated into the story, may be made user-settable. The picture data items displayed on the material selection area 200 become candidate pictures for incorporation at the time of story creation. However, when it is not possible to adopt all of the pictures, it is possible to preferentially use a picture data item that is set with a higher priority.

With this, the user can create a story in which the pictures desired by the user are adopted.

The template selection area 201 is an area in which templates that can be selected by the user are displayed.

As shown in FIG. 2, for example, a "person-centered, slow-tempo template", a "person-centered, up-tempo template", a "scenery-centered, slow-tempo template", a "scenery-centered, up-tempo template", and so on, are displayed as templates that can be selected by the user.

The "person-centered, slow-tempo template" is a template describing a story configured by retrieving mainly pictures of a person, and by using a picture switching effect that suits a slow-tempo BGM.

In the same manner, the "person-centered, up-tempo template" is a template which describes a story configured by retrieving mainly pictures of a person, and by using a picture switching effect that suits an up-tempo BGM.

The "scenery-centered, slow-tempo template" is a template describing a story configured by retrieving mainly pictures of a scenery, and by using a picture switching effect that suits a slow-tempo BGM.

In the same manner, the "scenery-centered, up-tempo template" is a template which describes a story configured by retrieving mainly pictures of a scenery, and by using a picture switching effect that suits an up-tempo BGM.

In each template display region, an image picture of the template, the template name, the reproduction time period of the BGM that is set for the template by default, and so on, are displayed.

It should be noted that templates (template data 104*d*) may be recorded in a recording unit such as the HDD 104 provided in the PC 100. It should be noted that the template data 104 to be recorded may be, for example, part of the previously-described program 104S of the picture editing software which is installed in the PC 100 and recorded in the recording unit (see FIG. 1).

The user can select a template by operating the mouse 105.

In this manner, by preparing plural types of templates, it is possible to change the atmosphere of the story to be created.

The BGM selection area 202 is an area for the user to arbitrarily designate a BGM to be used in the story.

The BGM selection area 202 includes a user designation checkbox (checkbox 203*c*), a register button (button 203*b*), a trial listening player (trial listening player 203*ax* including a trial listening button 203*ay*), and so on.

The user can switch between active and inactive states of the user designation checkbox by operating the mouse 105.

When the user designation checkbox is placed in the inactive state, the CPU 101 uses, in the story creation, the default BGM of the selected template.

When the user designation checkbox is placed in the active state, the CPU 101 uses, in the story creation, the BGM selected by the user.

Here, the reproduction time period of the BGM whose use is determined becomes the reproduction time period of the story to be created (see previously described total reproduction time period).

Furthermore, the user can register a BGM to be used in the story creation by pressing the register button by operating the mouse 105.

When the user presses the register button, the CPU 101 displays, on the liquid crystal display 109 (FIG. 1), the contents of a folder in which music data items are stored. Then, the user views the displayed contents of the folder and selects the desired music data item by mouse operation, and the like. With this, the user can register the BGM to be used in the story creation. Furthermore, the user can execute a trial listening of the BGM by pressing the trial listening button by operating the mouse 105.

The finish button 203 is a button for completing the selection of the material pictures, template, and BGM for the story creation.

The user can complete the selection by pressing the finish button 203 by operating the mouse 105. When the selections for the story creation are completed, the story is created based on the picture data items selected in the material selection area 200, the template selected in the template selection area 201, and the BGM information item designated in the BGM selection area 202.

3. Configuration of Verification Screen

Figure 3:
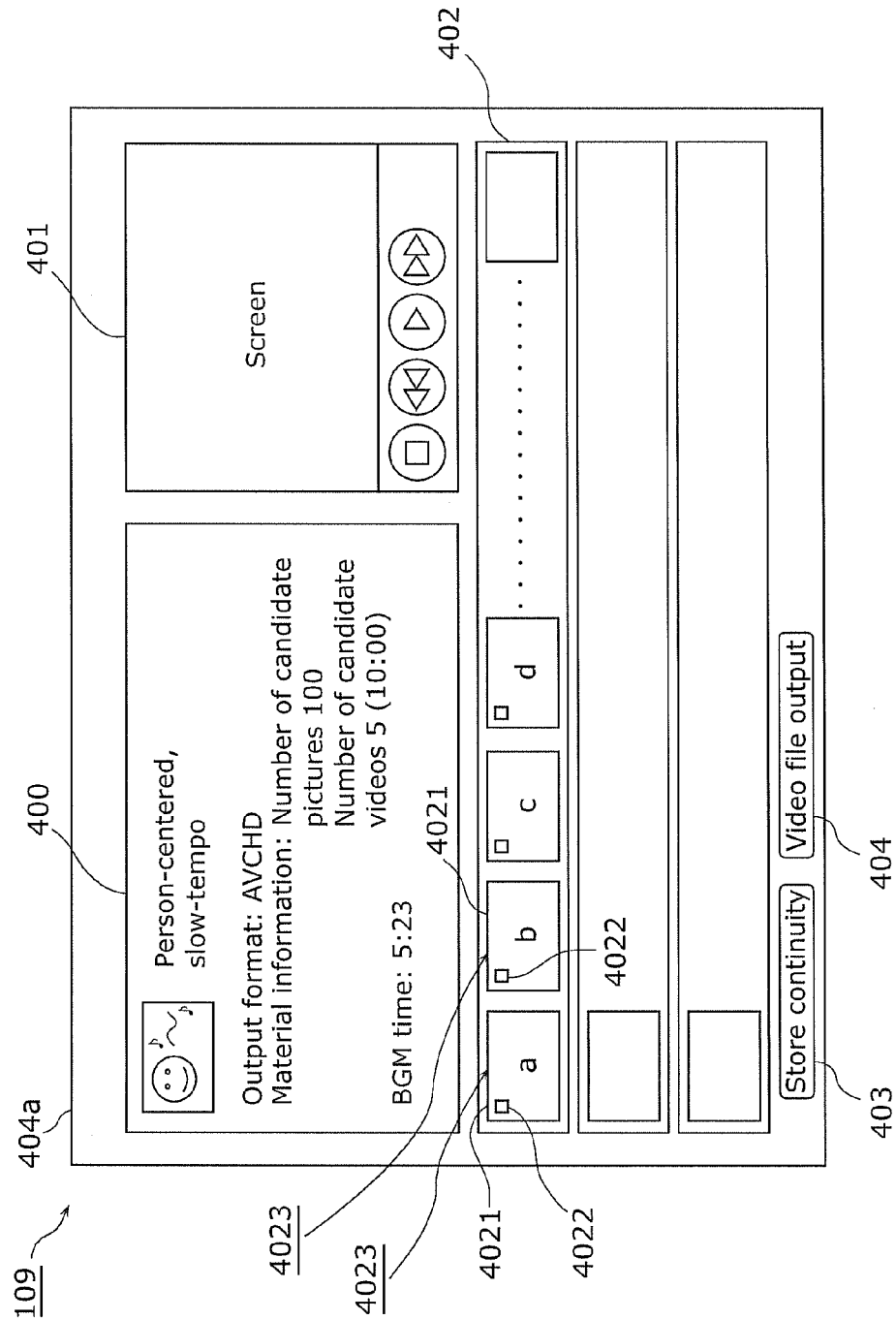
FIG. 3 is a diagram showing an image of a preview screen of the liquid crystal display according to Embodiment 1.

Next, a configuration of a verification screen (screen 404*a*) displayed on the liquid crystal display 109 shall be described using FIG. 3.

FIG. 3 is a diagram showing an image of the verification screen of the liquid crystal display 109.

As shown in FIG. 3, the verification screen displayed on the liquid crystal display 109 includes a story information display area 400, a preview area 401, a storyboard area 402, a store continuity button 403, a video file output button 404, and so on.

The story information display area 400 is an area in which information regarding the selections made by the user in the selection screen (FIG. 2) is displayed.

The information displayed includes the number of materials selected, the selected template name, the reproduction time period of the selected BGM, and so on, as shown in the figure.

Here, the number of materials selected is the number of still pictures and the number of videos which are candidates for incorporation into the story.

Although not shown in the figure, the number of still pictures and videos that are actually adopted may be displayed together.

With this, the user can verify how many pictures have been adopted out of the candidate pictures.

The preview area 401 is a screen for executing the reproduction of the created story. The user can actually verify the contents of the created story through images.

The storyboard area 402 is an area in which the details of the created scenario is displayed.

Plural boxes (plural pictures (thumbnail pictures) 4021) are arranged in the storyboard area 402, and the order in which the boxes are arranged corresponds to the order of display in the story.

Any of one of the pictures retrieved from the pictures displayed in the material selection area 200 is disposed in each of the boxes.

It should be noted that an icon (for example, see icon 4022) indicating a switching effect between pictures may also be displayed together.

Furthermore, a reproduction time period for when the picture disposed in each box is movie-displayed may also be displayed together.

With this, the user can verify which material is placed in what order, with what effect, and for what reproduction time period, in the story.

The store continuity button 403 can be selected by operating the mouse 105.

By pressing the store continuity button 403, the user can store, in the HDD 104, continuity information (see continuity data 115b in FIG. 7 described later) for managing which material is placed in what order, with what effect, and for what reproduction time period.

It should be noted that, although not shown in the figure, for example, a story read button may be provided on a screen in an upper hierarchical level, which allows the stored story information to be read.

The video file output button 404 can be selected by operating the mouse 105. By pressing the video file output button 404, the user can create a video file (see video file 115d in FIG. 7) based on the created story information.

It should be noted that the output format of the video file created at this time may be made selectable by the user beforehand. Specifically, for example, when the user selects the advanced video coded definition (AVCHD) file format, a video file in the AVCHD file format is created.

4. Template Configuration Information

Next, information carried by the template shall be described.

FIG. 4 is a diagram for describing a hierarchical structure in a template according to Embodiment 1.

A template is information describing the kind of switching effects and the order in which these are to be successively arranged during the creation of the story.

It should be noted that FIG. 4 schematically indicates the structure of such information.

The information describes how much reproduction time period is to be allotted to each of the switching effects whose order is described. The CPU 101 successively arranges the selected materials according to the order of the switching effects described in the template.

An example of a template shall be described using FIG. 4.

As shown in FIG. 4, the template includes an opening portion, a first main portion, a second main portion, and an ending portion.

It should noted that although the case where there are two main portions, namely, the first main portion and the second main portion, is exemplified in the present embodiment, there may be only one main portion or three or more main portions.

Furthermore, each of the opening portion, the first main portion, the second main portion, and the ending portion is made up of an effect node (nodes A, B, D to G, I, K to L, and M) or a repeat node (nodes C and H) having one or more effect nodes.

An effect node carries reproduction time period information of the material and type information of the switching effect.

It should be noted that an effect node cannot have a child node.

Then, the CPU 101 displays a picture according to the reproduction time period and switching effect designated in the respective effect nodes.

On the other hand, a repeat node carries information of an effect node belonging to a child node (for example, D to G) of such repeat node (for example C). Furthermore, the repeat node carries, for example, the designated number of repetitions for the repeat node (J) (for example, 2 times), and information for performing repetitions (for example, repetition count data 52n, shown in FIG. 4, for specifying the number of repetitions).

In a repeat node, it is possible to sequentially repeat, a plural number of times, the series of nodes designated as child nodes (child node 1, child node 2, . . . , child node n).

In the case of one repetition, the display order is from [child node 1] to [child node 2] to . . . to [child node n].

Meanwhile, in the case of two repetitions, the sequence [child node 1] to [child node 2] to . . . to [child node n] is repeated twice so that the display order is from [child node 1] to [child node 2] to . . . to [child node n] to [child node 1] to [child node 2] to . . . to [child node n].

The opening portion is described such that the reproduction time period per picture is made relatively long to enable the user to superimpose the title text of the story onto a picture.

In the example shown in FIG. 4, the opening portion is configured such that a 2-second "A fade-in" effect is followed by a 1-second "B crossfade" effect.

At this time, two pictures are used in the opening portion.

Specifically, these two pictures consist of the picture inserted into the screen, using the "A fade-in" effect, from the point where the liquid crystal display 109 is displaying a black screen, and the picture which is to be used following the first picture and is inserted into the screen using the "B crossfade" effect.

The first main portion and the second main portion are described such that the switching effects gradually build up excitement, since the main pictures of the story are disposed therein.

The second main portion is the climax, and is thus described to have a bolder switching effect that the first main portion.

In the example shown in FIG. 4, the first main portion has, as child nodes of the parent node C in the first main portion, four switching effects, namely, a 1-second "D slide-in right" effect, a 1-second "E slide-in left" effect, a 1-second "F slide-in up" effect, and a 1-second "G slide-in down" effect.

The first main portion is made up of the repeat node C which repeats such four child nodes, and is initially set with a number of repetitions of 2 (see FIG. 4).

Furthermore, the second main portion is made up of a repeat node H which repeats (i) a child node having a 1-second "I crossfade" effect and (ii) a child node which is the repeat node J which repeats two grandchild nodes, namely, a grandchild node having a 0.5-second "K rotate" effect and a grandchild node having a 0.5-second "L explode" effect.

At this time, the number of repetitions for the repeat node J is initially set to 2 times (see FIG. 4).

Furthermore, the number of repetitions for the repeat node H is initially set to 3 times.

When the story is generated according to the initially set number of repetitions and the effect nodes are arranged in order as described above, the order of effects is as follows: "[A fade-in, 2 secs.] to [B crossfade, 1 sec.] to [D slide in right, 1 sec.] to [E slide-in left, 1 sec.] to [F slide-in up, 1 sec.] to [G slide-in down, 1 sec.] to [D slide in right, 1 sec.] to [E slide in left, 1 sec.] to [F slide-in up, 1 sec.] to [G slide-in down, 1 sec.] to [I crossfade, 1 sec.] to [K rotate, 0.5 secs.] to [L explode, 0.5 secs.] to [K rotate, 0.5 secs.] to [L explode, 0.5 secs.] to [I crossfade, 1 sec.] to [K rotate, 0.5 secs.] to [L explode, 0.5 secs.] to [K rotate, 0.5 secs.] to [L explode, 0.5 secs.] to [I crossfade, 1 sec.] to [K rotate, 0.5 secs.] to [L explode, 0.5 secs.] to [K rotate, 0.5 secs.] to [L explode, 0.5 secs.] to [M fade-out, 2 secs.].

Subsequently, when the display time periods (reproduction time period) of these effects are summed up, the total is 22 seconds.

As described above, the template forms a tree structure having repeat nodes and effect nodes.

5. Story Creation Operation

Next, description shall be carried out for the process of creating a story based on the selected materials (see material selection area 200 in FIG. 2), the selected template (see template selection area 201), and the selected BGM (see BGM selection area 202).

Figure 5:
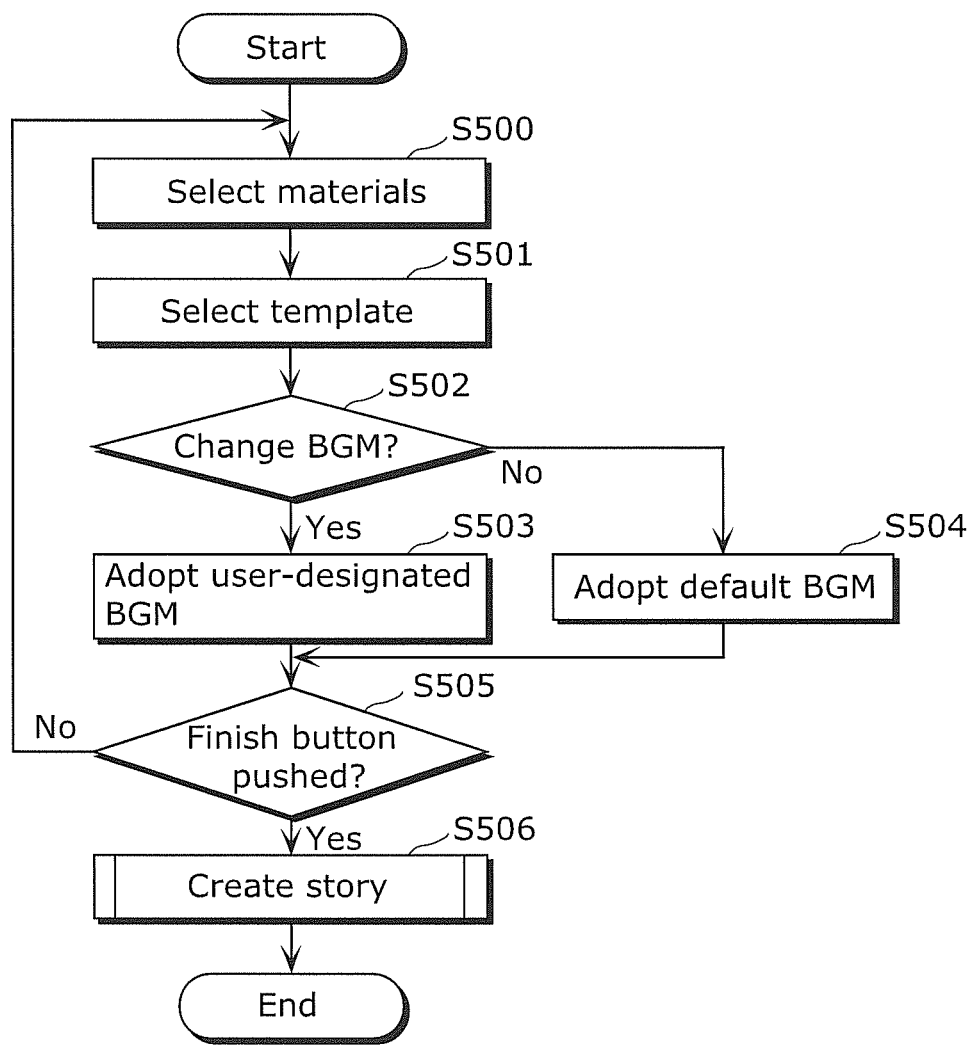
FIG. 5 is an outline flowchart of story creation according to Embodiment 1.

FIG. 5 is an outline flowchart of story creation according to Embodiment 1.

First, the user selects the pictures to be used in the story creation (S500).

When the pictures are selected, the CPU 101 displays the selected pictures in the material selection area 200.

It should be noted that, from here, the user may be allowed to additionally set priorities to the selected pictures, as described above.

Next, the user selects the template to be used in the story creation (S501).

When the template is selected, the CPU 101 displays the template in a highlighted manner, in the template selection area 201.

Next, the user decides whether or not to adopt the default BGM of the selected template, in the story creation (S502).

When the default BGM of the selected template is not to be adopted (S502: Yes), the user places the user designation checkbox 203c (FIG. 2) into the active state and registers the desired music data, as described above.

Subsequently, the CPU 101 adopts, as the BGM, the music data registered by the user (S503).

On the other hand, when the default BGM of the selected template is to be adopted (S502: No), the user places the user designation checkbox 203c into the inactive state. At this time, the CPU 101 adopts the default BGM of the selected template (S504).

It should be noted that the operational order of steps S500 and step S502 may be interchanged as deemed fit.

When the selection of the materials, template, and BGM to be used in the story creation is finished, the user can confirm the selections by pressing the finish button 203 (FIG. 2) (S505).

Then, the CPU 101 creates the story based on the selections (S506).

Next, the detailed operations of the story creation in step S506 shall be described.

Figure 6:
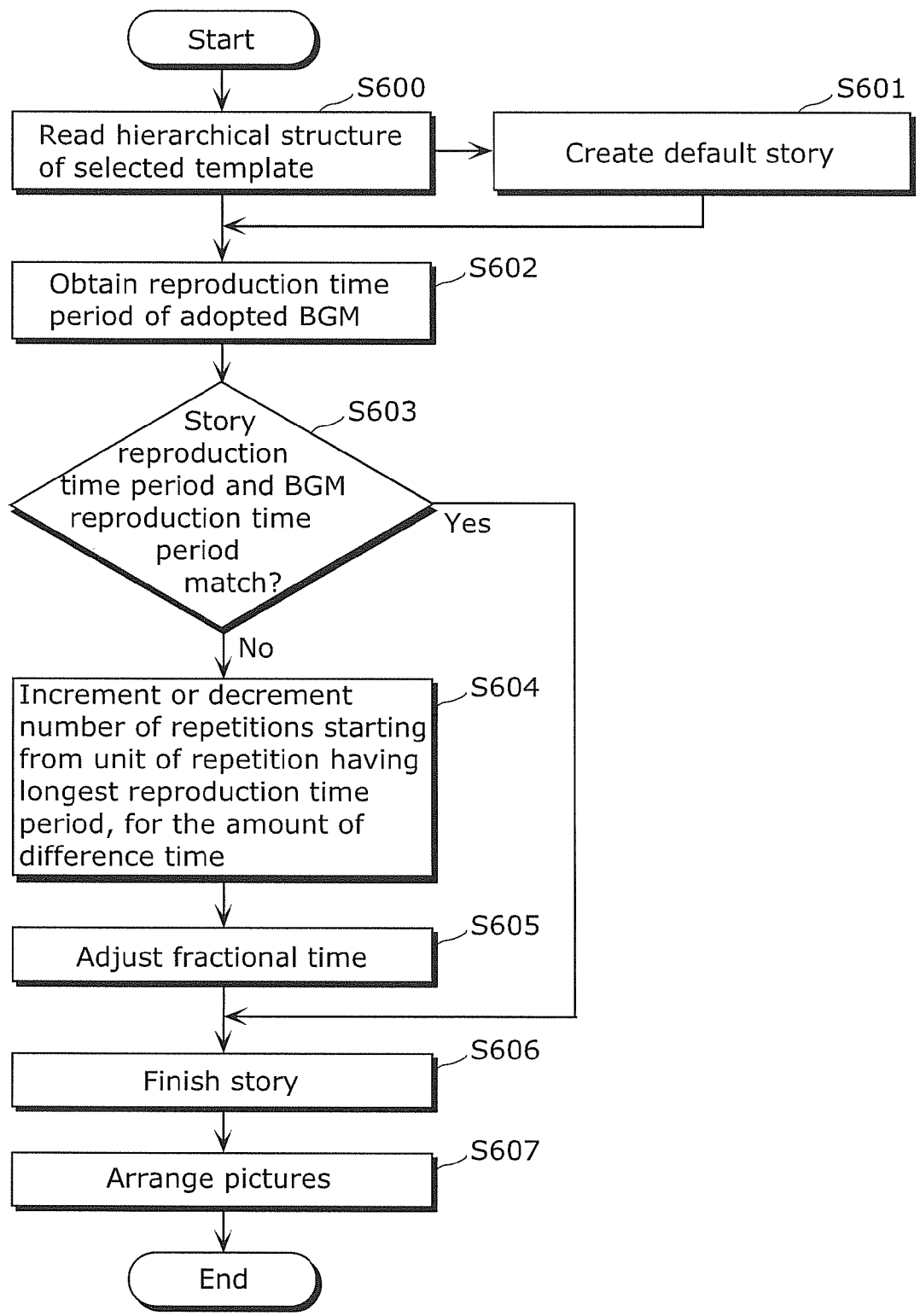
FIG. 6 is a detailed flowchart of the story creation according to Embodiment 1.

FIG. 6 is a detailed flowchart of the story creation (S506 in FIG. 5) according to Embodiment 1.

First, the CPU 101 reads the information of the template selected in step S501 (S600).

Next, the CPU 101 creates the story according to the initially set number of repetitions (2 times in C in FIG. 4) in the read information of the template (S601).

According to the above-described example (FIG. 4), the reproduction time period of the story at this time is 2+1+{1+1+1+1}×2+{1+(0.5+0.5)×2}×3+2=22 seconds.

Next, the CPU 101 obtains the reproduction time period of the BGM selected in step S502 to step S504 (FIG. 5) (S602).

Here, it is assumed that, for example, a 34.5-second BGM is selected.

Next, the CPU 101 compares to find out whether or not the reproduction time period of the created story (22 seconds) and the reproduction time period of the BGM (34.5 seconds) match (S603).

When the reproduction time period of the created story and the reproduction time period of the BGM do not match (S603: No), the CPU 101 matches the reproduction time period of the story to the reproduction time period of the BGM by increasing or decreasing the number of repetitions.

Such process in step S604 shall be described in more detail below.

First, all the repeat nodes in the template are listed and the unit repetition time upper iteration for each repeat node among the one or more repeat nodes listed is checked.

Hereinafter, it is assumed that $u(X)$ is the unit repetition time of a node X.

In the template shown in FIG. 4, each of the three nodes, namely, node C, node H, and node J, are repeat nodes.

In addition, since the repetition length per iteration (the length of one repetition) of the node C is equal to the length of the node D+node E+node F+node G, then $u(C)=1+1+1+1=4$ seconds. In the same manner, $u(J)=0.5+0.5=1$ second.

Since the repeat node J is included in the child node for node H, the initially set number of repetitions of node J (=2) is used, and thus $u(H)=1+2*u(J)=1+2*1=3$ seconds.

Next, the CPU 101 calculates the difference (hereafter called error time) between the reproduction time period of the story and the reproduction time period of the BGM, and increases or decreases the number of repetitions so that the difference becomes 0. Specifically, when the story reproduction time period is longer than the BGM reproduction time period, the story reproduction time period is adjusted by decrementing the number of repetitions.

Inversely, when the story reproduction time period is shorter than the BGM reproduction time period, the story reproduction time period is adjusted by incrementing the number of repetitions. At this time, the CPU 101 sequentially selects, according to the following concepts, a node for which the number of repetitions is to be adjusted.

The process for condition 1 is as follows.

Specifically, a unit of repetition which is judged as having a longer unit repetition time u that is within the error time is preferentially selected. Then, the number of repetitions for such unit of repetition is incremented once.

Furthermore, the process for condition 2 is as follows.

Specifically, when there are plural repeat nodes with the same unit repetition time u, any one from such plural repeat nodes may be selected.

It should be noted that, for example, when there is a repeat node whose number of repetitions has already been increased or decreased, a repeat node on which the increase or decrease has not yet been performed is preferentially selected. Then, the number of repetitions for such unit of repetition is incremented once.

In addition, the process for condition 3 is as follows.

Specifically, it is presumed that there are situations where, when a repeat node having a unit repetition time of u1 is selected according to condition 1, the number of repetitions for all nodes having a unit repetition time u1 is incremented twice.

In other words, when the number of repetitions of a node having a unit repetition time of u1 is further incremented once in such a situation, the repetitions of such unit of repetition can become drawn out.

The process of the present condition may be applied in order to avoid this.

Specifically, for example, in the case where it is judged that a node length u2 which is the longest unit repetition time next to u1 satisfies u1<u2*2, the repeat node of u2 may be selected and the number of repetitions thereof incremented once, in place of the repeat node of u1.

It should be noted that, when there is no appropriate node satisfying u1<u2*2 at this time, it is sufficient to select the repeat node of u1 again. In other words, it is sufficient to increment the number of repetitions for u1 one more time.

Furthermore, the process for condition 4 is as follows.

Specifically, when the error time becomes smaller than the smallest value of the repetition time of the node, the adjustment of the number of repetitions in step S604 is ended.

Next, when the error time becomes smaller than the smallest value of the node repetition time, the remaining error time is reduced to 0 through fine-adjustment of the reproduction time period of each of the nodes.

It should be obvious that fine-adjustment of the reproduction time periods is unnecessary when the error time has already been reduced to 0 through the application of the concepts in condition 1 to condition 3 described earlier.

When fine-adjusting for the error time (see S605 in FIG. 6), the CPU 101 lists-up the effect nodes of the story.

Then, the CPU 101 sequentially selects nodes starting from the node with the longest reproduction time period and alters the reproduction time period thereof so as to approach the BGM reproduction time period (S605).

It should be noted that, for example, the range of time that can be altered in a single node is assumed to be within ±10% of the original reproduction time period of the effect node.

The operations of step S604 and step S605 shall be described given the example below.

The case where the length of the BGM is 34.5 seconds shall be considered as an example.

At this time, the error time between the story reproduction time period and the BGM reproduction time period is 12.5 seconds.

First, the CPU 101 increments the number of repetitions of C (4 secs.), according to condition 1. With this, the remaining error time becomes 8.5 seconds.

Next, the CPU 101 increments the number of repetitions of C (4 secs.), again according to condition 1. With this, the remaining error time becomes 4.5 seconds.

At this time, although the reproduction time period of the repeat node C satisfies condition 1, C has already been selected twice at this point. Therefore, according to condition 3, the number of repetitions of H (3 secs.) is incremented. With this, the remaining error time becomes 1.5 seconds.

Then, the CPU 101 increments the number of repetitions of J (1 sec.), according to condition 1. With this, the remaining error time becomes 0.5 seconds.

At this time, there is no repeat node that can be assigned for the remaining error time, and thus condition 4 is applied at this point, and step S604 is ended. Specifically, using the symbols of the respective nodes, the current story has the following order.

A-B-(D-E-F-G)-(D-E-F-G)-(D-E-F-G)-(D-E-F-G)-(I-(K-L)-(K-L))-(I-(K-L)-(K-L))-(I-(K-L)-(K-L))-(I-(K-L)-(K-L)-(K-L))-M

Here, since the reproduction time periods of the respective nodes are A=M>B=D=E=F=G=I>K=L, a total of 0.5 secs. of error can be filled up by adding 0.2 secs. to A (2 secs.), adding 0.2 secs. to M (2 secs.), and adding 0.1 sec. to B (1 sec.). In this manner, the length of the story can be adjusted to 34.5 seconds.

Thus, the number of repetitions of the respective units of repetition described in the template selected in step S501 is determined in the manner described above (S604).

Furthermore, the story reproduction time period is fine-adjusted for the amount of error time (S605).

It should be noted that, when the story reproduction time period and the BGM reproduction time period match in step S603, the initially set number of repetitions are applied as they are (S603: Yes).

The CPU 101 arranges the selected pictures in the story according to the number of repetitions determined in step S603 to step S605 (S606).

At this time, the CPU 101 sorts, by shooting date and time order, pictures from among the pictures displayed in the material selection area 200, and sequentially applies the sorted pictures to the respective nodes within the story.

When the number of pictures serving as materials is less than the number of nodes in the story, the same material pictures are randomly used multiple times.

When the number of pictures serving as materials is greater than the number of nodes in the story, materials to be used are selected according to the conditions below.

Specifically, the selection under condition 1 is as follows. Specifically, pictures are selected uniformly from all the materials without any bias as to shooting date and time.

Furthermore, the selection under condition 2 is as follows. Specifically, when a person-centered template is selected as the template, pictures in which a person is the main subject are preferentially selected.

Furthermore, the selection under condition 3 is as follows. Specifically, when a scenery-centered template is selected as the template, pictures in which a scenery is the main subject are preferentially selected.

Furthermore, the selection under condition 4 is as follows. Specifically, when the pictures displayed in the material selection area 200 are set with priorities in step S500, pictures having higher priority are preferentially selected.

With the above-described operation, the CPU 101 ends the story creation operation.

6. Conclusion

As described above, the PC 100 according to the present embodiment executes a method that includes: a picture obtainment step (S500) of obtaining plural pictures; a generation step (S607) of generating a movie based on the obtained pictures; a reproduction time period obtainment step (S602) of obtaining the reproduction time period when the movie is reproduced and displayed; an information reading step (S600) of reading a template in which each of repeat nodes in which a switching effect between the pictures making up the movie are sorted together with the number of repetitions of the node and the unit time of the switching effect; an adjustment step (S604) of adjusting the number of repetitions of a unit of repetition based on the acquired reproduction time period and the read unit time; and a control step (S606) of controlling a generation unit to cause it to generate the movie based on the adjusted number of repetitions.

Accordingly, since the PC 100 adjusts the number of repetitions without adding or deleting switching effects that are to be repeated, the PC 100 can create a movie without breaking up the initially planned story configuration. Specifically, the PC 100 can edit with more emphasis on the story configuration of the movie.

Furthermore, in the above-described embodiment, the template sorts, into a hierarchical structure, each of repeat nodes in which a switching effect between the pictures making up the movie, together with the number of repetitions of the node and the unit time of the switching effect.

Accordingly, when the error time is long, the PC 100 can assign a repeat node located in a higher level of the hierarchical structure for the reproduction time period.

On the other hand, when the error time becomes short, the PC 100 can assign a repeat node having a shorter reproduction time period for the reproduction time period.

Furthermore, in the adjustment step, the PC 100 preferentially adjusts the number of repetitions of a repeat node for which the total time of its unit times is relatively long.

With this, it is possible to avoid excessive repetition of only repeat nodes having relatively short reproduction time periods.

Furthermore, in the adjustment step, the PC 100 adjusts the unit time of a repeat node having a relatively longer unit time, when there is a fractional time in the obtained reproduction time period after the number of repetitions of the repeat nodes are adjusted.

With this, the CPU 101 can fine-adjust the reproduction time period of the story even when the error time is very short.

7. Other Embodiments

The present invention is not limited to the above-described Embodiment 1, and other embodiments are also possible.

Hereinafter, other embodiments of the present invention shall be described collectively.

Although step S605 is executed after executing step S604 in Embodiment 1, the present invention is not limited to such.

Specifically, in the case where the error time is below a predetermined percentage, and so on, such as for example below 10% of the story reproduction time period when the story reproduction time period and the BGM reproduction time period do not match in step S603, application of the reproduction time period fine-adjustment in step S605 is tried once. If successful, step S604 and step S605 are skipped and the operational flow moves to step S606.

Although Embodiment 1 describes the case where the CPU 101 automatically creates a story up to completion, it is also acceptable to allow the user to fine-adjust the details of the story just before completion.

With this, the user can fine-adjust the pictures, switching effects, number of repetitions, and so on, which are the details of the automatically created story.

It should be noted that, for example, the total time (4 secs.) in a unit of repetition in a higher level (for example, H in FIG. 4) is longer than the total time (3 secs.) in a unit of repetition in a lower level (J). As such, in adjusting the number of repetitions, it is acceptable for the CPU 101 to adjust, to a greater number of iterations, only the number of repetitions in a higher level and not the number of repetitions in a lower level.

It should be noted that the present invention can be implemented, not only as a device, a system, an integrated circuit, and so on, but also as: a method having, as steps, the processing units included in such device; a program causing a computer to execute such steps; a computer-readable recording medium, such as a CD-ROM, on which such program is recorded; and information, data, or a signal representing such program. Moreover, such program, information, data and signal may be distributed via a communication network such as the Internet.

It should be noted that the present invention is not limited to the above-described embodiments. Various modifications to the present embodiments that can be conceived by those skilled in the art, and forms configured by combining constituent elements in different embodiments without departing from the teachings of the present invention are included in the scope of the present invention.

INDUSTRIAL APPLICABILITY

The present invention relates to electronic devices and particularly to an electronic device capable of picture editing operations. Specifically, aside from being applied to the PC 100, the present invention can be applied to electronic devices such as a cellular phone, a video camera, and so on, as long as these devices are capable of picture editing operations. Furthermore, the present invention can also be applied in a recording medium, such as a CD, DVD, and so on, on which a program capable of executing the same functions is recorded.

What is claimed is:

1. A picture editing device comprising:
   a picture obtainment unit configured to obtain a plurality of pictures;
   a reproduction time period obtainment unit configured to obtain a reproduction time period for when a video is reproduced, the video including one or more of the pictures which are displayed successively;
   an information reading unit configured to read template information for specifying (i) the number of repetitions of each of units of repetition made up of one or more switching effects used in switching between two of the pictures included in the video, and (ii) a unit time of each of the one or more switching effects of the unit of repetition; and
   an adjustment unit configured to adjust the number of repetitions of the unit of repetition, based on the obtained reproduction time period and each of the unit times specified in the read template information.

2. The picture editing device according to claim 1, further comprising
a generation unit configured to generate the video, based on the adjusted number of repetitions and one or more of the pictures in the unit of repetition.

3. The picture editing device according to claim 1, wherein the template information specifies, using a hierarchical structure, a relatively high-level one of the units of repetition and a relatively low-level one of the units of repetition, together with the number of repetitions and unit times of the one or more switching effects of the specified units of repetition.

4. The picture editing device according to claim 1, wherein said adjustment unit is configured to preferentially adjust the number of repetitions of a unit of repetition having a longer total time among the units of repetition, the total time being obtained by summing up the respective unit times of the one or more switching effects of the unit of repetition.

5. The picture editing device according to claim 1, wherein, when there is a fractional time in the obtained reproduction time period after adjusting the number of repetitions of the unit of repletion, said adjustment unit is configured to adjust the unit time of one of the switching effects having a relatively longer unit time, and to avoid adjusting the unit time of one of the switching effects having a relatively shorter unit time, the fractional time being a time during which the video is not reproduced.

6. The picture editing device according to claim 1, wherein said generation unit is configured to cause a display unit to display each of the pictures to be displayed successively and a display object indicating a presentation effect in the displaying of the picture.

7. The picture editing device according to claim 1, wherein said adjustment unit is configured to adjust the number of repetitions of the unit of repetition only when the adjustment of the number of repetitions of the unit of repetition has not been performed in a past, and to avoid adjusting the number of repetitions of the unit of repetition when the adjustment has been performed in the past.

8. A picture editing method comprising:
obtaining a plurality of pictures;
obtaining a reproduction time period for when a video is reproduced, the video including one or more of the pictures which are displayed successively;
reading template information for specifying (i) the number of repetitions of each of units of repetition made up of one or more switching effects used in switching between two of the pictures included in the video, and (ii) a unit time of each of the one or more switching effects of the unit of repetition; and
adjusting the number of repetitions of the unit of repetition, based on the obtained reproduction time period and each of the unit times specified in the read template information.

9. An integrated circuit comprising:
a picture obtainment unit configured to obtain a plurality of pictures;
a reproduction time period obtainment unit configured to obtain a reproduction time period for when a video is reproduced, the video including one or more of the pictures which are displayed successively;
an information reading unit configured to read template information for specifying (i) the number of repetitions of each of units of repetition made up of one or more switching effects used in switching between two of the pictures included in the video, and (ii) a unit time of each of the one or more switching effects of the unit of repetition; and
an adjustment unit configured to adjust the number of repetitions of the unit of repetition, based on the obtained reproduction time period and each of the unit times specified in the read template information.

10. A non-transitory computer-readable recording medium on which a computer program is recorded, the program causing a computer to execute:
obtaining a plurality of pictures;
obtaining a reproduction time period for when a video is reproduced, the video including one or more of the pictures which are displayed successively;
reading template information for specifying (i) the number of repetitions of each of units of repetition made up of one or more switching effects used in switching between two of the pictures included in the video, and (ii) a unit time of each of the one or more switching effects of the unit of repetition; and
adjusting the number of repetitions of the unit of repetition, based on the obtained reproduction time period and each of the unit times specified in the read template information.

* * * * *